Patented Sept. 16, 1952

2,610,965

UNITED STATES PATENT OFFICE 2,610,965

HOMOGENEOUS POLYMERIZATION OF VINYLIDENE COMPOUNDS USING A HYDROPEROXIDE CATALYST AND A BASIC NITROGEN COMPOUND

Edwin J. Vandenberg, Wilmington, Del., assignor to Hercules Powder Company, Wilmington, Del., a corporation of Delaware No Drawing. Application December 24, 1948, Serial No. 67,247

20 Claims. (Cl. 260—80)

This invention relates to an improved process for the homogeneous polymerization of unsaturated compounds and more particularly to an improved process of homogeneously polymerizing vinyl, vinylidene, and vinylene compounds.

It is well known that the homogeneous polymerization of vinyl-type compounds may be accelerated by means of heat, actinic light, or a catalyst such as the organic peroxides. Of these accelerators, the peroxidic catalysts have been the most widely employed but difficulty is frequently encountered in obtaining a high yield of the polymer in a reasonable length of time without resorting to the use of high temperatures. In addition, many of the peroxide catalysts tend to discolor the polymer and to produce polymers with lower average molecular weights.

Now in accordance with this invention it has been found that the homogeneous polymerization of monomeric compounds containing the $CH_2=C<$ group, and which are capable of being polymerized by a peroxide catalyst, may be greatly accelerated by carrying out the polymerization in the presence of an $\alpha,\alpha$-dialkylarylmethyl hydroperoxide and ammonia, an amine, or a hydrazine. It has been found that the time required for the polymerization of vinyl-type compounds by these hydroperoxides may be greatly shortened by the incorporation of such basic nitrogen compounds and that this acceleration may be further enhanced by the addition of an $\alpha$-hydroxycarbonyl compound and an organic-soluble heavy metal compound.

The following examples are illustrative of the process of homogeneous polymerization in accordance with this invention. All parts and percentages given in the examples represent parts and percentages by weight.

Examples 1-5

In each of these examples a glass polymerization vessel was charged with 100 parts of powdered hydroabietyl fumarate, 2 parts of monoamyl amine, 2 parts of cumene hydroperoxide and acetylacetone and/or ferric acetylacetonate. A slight excess of isobutylene over the amount required to give a 3:1 ratio of hydroabietyl fumarate to isobutylene was then added and the excess permitted to boil off before closing the vessel in order to sweep the air out of the free space in the vessel. In Example 4 the air was not swept out of the polymerization vessel before the polymerization reaction. The reaction mixture was then heated to and held at 65° C., an aliquot being taken from the reaction vessel at intervals in order to determine the percentage conversion to the copolymer. The per cent conversion indicated in the following table is the per cent of the hydroabietyl fumarate converted to the copolymer. The following table sets forth the conversion obtained when an amine is added to the polymerization system, when a combination of the amine and acetylacetone is added, when the combination of an amine and ferric acetylacetonate is added, and when all three ingredients are added to the polymerization mixture.

|  | Parts of Ingredient Added | | | Percent Conversion | |
| --- | --- | --- | --- | --- | --- |
|  | Amine | Acetylacetone | Ferric Acetylacetonate | 7 hrs. | 24 hrs. |
| Example 1 | 2.0 | | | 46 | 80 |
| Example 2 | 2.0 | 1.0 | | [1]81 | 95 |
| Example 3 | 2.0 | | | [1]92 | 95 |
| Example 4 | 2.0 | | 0.2+air | 88 | 89 |
| Example 5 | 2.0 | 1.0 | 0.2 | 92 | 94 |

[1] 8 hours.

The polymerization process in accordance with this invention is carried out by the bulk or solution method of homogeneous polymerization using the combination of an $\alpha,\alpha$-dialkylarylmethyl hydroperoxide and a basic nitrogen compound, i. e., ammonia, an amine or a hydrazine to initiate the polymerization. As may be seen from the foregoing examples, by carrying out these polymerizations in the presence of an amine an excellent conversion to the polymer is obtained in relatively short periods of time. An even further increase in conversion in a given time is obtained when either an organic-soluble heavy metal compound or an $\alpha$-hydroxycarbonyl compound or a combination of these two accelerators is also added to the reaction mixture.

The $\alpha,\alpha$-dialkylarylmethyl hydroperoxides used as the catalysts in the process of this invention have the following structural formula

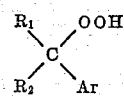

wherein $R_1$ and $R_2$ represent alkyl groups and Ar represents a substitutent selected from the group consisting of aryl and alkaryl groups. Exemplary of such hydroperoxides are $\alpha,\alpha$-dimethylbenzyl, $\alpha,\alpha$-dimethyl-p-isopropylbenzyl, $\alpha,\alpha$-dimethyl-p-methylbenzyl, and $\alpha,\alpha$-ethylmethylbenzyl hydroperoxides. These compounds may also be named as aryl(dialkyl)methyl hydroperoxides.

The $\alpha,\alpha$-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the aqueous alkali may be between about 1 and about 35% although it is preferable to use concentrations of about 2 to about 8%. Vigorous agitation is desirable during the oxidation reaction.

As illustrative of the alkyl-substituted aromatic organc compounds which may be oxidized, p-cymene, cumene, sec-butylbenzene, and diisopropylbenzene may be mentioned. The first three lead to $\alpha,\alpha$-dimethyl-p-methylbenzyl, $\alpha,\alpha$-dimethylbenzyl, and $\alpha,\alpha$-ethylmethylbenzyl hydroperoxides, respectively, whereas diisopropylbenzene, containing two tertiary carbon atoms may be oxidized to either a mono- or a di-hydroperoxide, either of which may be used in the polymerizations of this invention. The aryl and alkaryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl and the like, the same alkyl groups also being representative of $R_1$ and $R_2$ in the structural formula. $R_1$ and $R_2$ may be either the same or different.

The amount of hydroperoxide which may be used in accordance with this invention may be from about 0.001 to about 5% based on the monomers, and preferably is from about 0.1 to about 3%.

The basic nitrogen compound which is used in conjunction with the $\alpha,\alpha$-dialkylarylmethyl hydroperoxide to accelerate the polymerization reaction in accordance with this invention may be ammonia, an amine, or a hydrazine. The ammonia may be used as such or in the form of its aqueous solutions. Any simple amine may be used as for example primary, secondary, or tertiary amines, aliphatic, alicyclic, aromatic or heterocyclic amines, etc. Exemplary of the amines which may be used are butylamine, amylamine, dibutylamine, triethylamine, tributylamine, cyclohexylamine, aniline, dimethylaniline, toluidine, benzylamine, pyridine, etc. Another type of amine which may be used are the hydrazines as for example hydrazine, alkylhydrazines, phenylhydrazine, etc.

It is not known how the basic nitrogen compound functions in the polymerization system. It probably reduces the acidity of the system and may react with the hydroperoxide to generate free radicals. It may also promote reaction between the reducing agent and the metallic compound in those cases where the latter are also incorporated in the polymerization system. Regardless of the theory which may be used to explain the action of these basic nitrogen compounds, it has been found that the addition of ammonia, an amine, or a hydrazine to the polymerization system in accordance with this invention causes a very great acceleration of the polymerization reaction. The foregoing examples illustrate that these compounds may be used alone with the hydroperoxides or they may be used with an $\alpha$-hydroxycarbonyl compound and/or an organic-soluble heavy metal compound, the latter two ingredients when used together acting as the so-called redox system. In any event the use of the ammonia, amine, or hydrazine accelerates the polymerization to such an extent that lower polymerization temperatures may be used. The amount of the basic nitrogen compound to be added will depend upon the monomer being polymerized, the amine, temperature, etc. In general, an amount of from about 0.005% to about 5% based on the monomer should be used and preferably an amount of from about 0.05% to about 2% is used.

The addition of a reducing agent to the combination of hydroperoxide and amine is also advantageous in initiating the polymerization process in accordance with this invention. The reducing agents which are operable may be defined as an $\alpha$-hydroxycarbonyl compound, or a compound behaving as an $\alpha$-hydroxycarbonyl compound. In general, those aldehydes and ketones containing a hydroxyl group on an adjacent carbon atom in an alkyl chain, and having thereby in common the structural group

are operable. Exemplary of the $\alpha$-hydroxycarbonyl compounds which may be used are glycolic aldehyde, lactic aldehyde, $\alpha$-hydroxyisobutyraldehyde, acetol, ethyl hydroxymethyl ketone, acetylacetone, ascorbic acid, acetoin, propionoin, butyroin, isobutyroin, pivaloin, benzoin, anisoin, cuminoin, etc. Another group of $\alpha$-hydroxycarbonyl compounds which may be mentioned are the aldoses and ketoses, the most common of which are glucose, fructose, etc. In general, the aldoses and ketoses are not as effective in the polymerization systems of this invention if they are insoluble therein. However, if the solvent is such as to dissolve these materials, then they are equally effective. Therefore, the $\alpha$-hydroxycarbonyl compound is preferably one which is soluble in the polymerization system. The amount of $\alpha$-hydroxycarbonyl compound which may be added to assist the acceleration of the polymerization reaction in accordance with this invention may vary from about 0.01% to about 5%, based on the weight of the monomers.

The addition of a heavy metal compound which is soluble in the polymerization system is also advantageous in initiating the polymerization processes in accordance with this invention. Examples 3 and 4 illustrate the increase in the yield of polymer obtained by adding such an organic-soluble heavy metal compound as ferric acetylacetonate to the system, Example 4 illustrating that the metallic complex acts to accelerate the polymerization reaction even in the presence of oxygen. The heavy metal compound may be any heavy metal salt or complex which is soluble in the polymerization system; i. e., which is sufficiently soluble in organic solvents to provide the necessary concentration of metallic ions. Among the heavy metal compounds which may be used are the compounds of iron, cobalt, nickel, copper, silver, zinc, cadmium, mercury chromium, manganese, or molybdenum. The heavy metal compound may be a complex wherein the metal is united to another element through coordinate covalences as for example the chelate-type complexes such as iron phthalocyanine, the chelates of condensation products of o-hydroxy aldehydes and ethylene diamines, etc. or it may be a true salt as, for example, the iron resinate used in Example 7 below or ferric chloride, acetate, stearate, naphthenate, etc. Iron compounds in general are preferred, usually the ferric compounds, but it is also possible to use ferrous compounds such as ferrous pyrophosphate, ferrous silicate, ferrous clays, etc., which compounds may be used without the presence of a reducing agent. The amount of metallic compound added to the polymerization system may vary from about 0.1 to 10,000 parts per million based on the monomer or preferably from about 1 to about 1,000 parts per million.

As may be seen from the foregoing discussion, the homogeneous polymerization of vinyl-type monomers is greatly accelerated by carrying out the polymerization in the presence of an $\alpha,\alpha$-dialkylarylmethyl hydroperoxide and ammonia, an amine, or a hydrazine and the acceleration is further increased by the addition of an organic-soluble heavy metal compound. Likewise, the acceleration obtained by the combination of an $\alpha,\alpha$-dialkylarylmethyl hydroperoxide and the basic nitrogen compound may be increased by adding an $\alpha$-hydroxycarbonyl compound. It has also been found that all four factors may be combined to initiate the polymerization with outstanding effectiveness and in fact may be preferred. An examination of Examples 2, 3 and 5 might indicate that there is no advantage to be gained by combining all four ingredients since approximately equal conversions were obtained in the combination of hydroperoxide, amine and $\alpha$-hydroxycarbonyl compound or in the combination of hydroperoxide, amine and heavy metal compound, as were obtained with all four ingredients. However, when both the $\alpha$-hydroxycarbonyl compound and the heavy metal compound are combined with the amine and hydroperoxide there is a more rapid initial conversion, as illustrated by the following example, than when only one of them is added to the amine-hydroperoxide combination, thus a faster polymerization is obtained.

Example 6

Examples 3 and 5 were repeated except that the ratio of hydroabietyl fumarate to the isobutylene was 4:1. The following table shows the conversion obtained at the end of 1, 2, 3.5, 5 and 7 hours, in the hydroperoxide, amine, and ferric acetylacetonate system, and the same system to which acetylacetone has been added.

| Hours | Percent Conversion | |
|---|---|---|
|  | No Acetylacetone | 1 part Acetylacetone |
| 1 | 21 | 59 |
| 2 | 40 | 79 |
| 3.5 | 58 | 91 |
| 5 | 78 | 92 |
| 7 | 92 |  |

As already pointed out, and illustrated by the foregoing examples, the homogeneous polymerization of a vinylidene compound with an $\alpha,\alpha$-dialkylarylmethyl hydroperoxide is greatly accelerated by the addition of an amine and is even further accelerated by the incorporation of a metallic compound and an $\alpha$-hydroxycarbonyl compound. Accordingly, the combination of these four ingredients for accelerating the polymerization is preferred. The following examples illustrate the wide variety of basic nitrogen compounds which are operable and the many combinations of the four ingredients which may be used to accelerate the polymerization reaction in accordance with this invention.

Example 7

A glass polymerization vessel was charged with 100 parts of hydroabietyl fumarate, 25 parts of isobutylene, 2.0 parts of cumene hydroperoxide, 2.0 parts of monoamyl amine, 1 part of acetylacetone and 0.2 part of ferric acetylacetonate. The polymerization was carried out at 40° C. A 48% conversion was obtained in 3 hours and 80% conversion in 6 hours.

This experiment was repeated except that 0.67 part of ferric resinate (the ferric salt of disproportionated rosin) was substituted for the ferric acetylacetonate. A conversion of 50% was obtained in 3 hours and 79% conversion in 6 hours.

Example 8

Four glass polymerization vessels were each charged with 100 parts of hydroabietyl fumarate, 25 parts of isobutylene, 2.0 parts of cumene hydroperoxide, 2.0 parts of monoamyl amine and varying amounts of ferric acetylacetonate and benzoin as indicated in the table below. The polymerizations were carried out at 40° C. The per cent conversion obtained at the end of 1, 2 and 24 hours was as follows:

| Ferric Acetylacetonate | Benzoin | Percent Conversion | | |
|---|---|---|---|---|
|  |  | 1 hr. | 2 hrs. | 24 hrs. |
| 0.2 | 1.0 | 94 | 98 | 99 |
| 0.02 | 1.0 | 77 | 93 | 100 |
| 0.2 | 0.5 | 67 | 80 | 99 |
| 0.2 | 0.25 | 39 | 47 | 96 |

Examples 9–16

Glass polymerization vessels were each charged with 100 parts of monomer, 1.00 part of cumene hydroperoxide and benzoin, an amine, and a metallic compound. Where the latter was ferric resinate, it was added as a 42% solution in benzene. After all of the ingredients had been added the air was removed and replaced with nitrogen. In Examples 13 and 14, the amine was injected into the polymerization vessel just prior to starting the polymerization. The polymerizations were all carried out at 40° C. except Example 14 which was done at room temperature. In Example 11, about 10 parts of ethyl acetate were added after 4 hours at the polymerization temperature of 40° C. and the polymerization continued. The amount of each ingredient added, the reaction time and the per cent conversion to polymer obtained in each example is set forth in the following table. In the case of the methyl acrylate polymerizations, the percentage conversion is not given if the solution set to a solid in the time indicated, which indicates a conversion of 80 to 100%. In Example 15 an α-hydroxycarbonyl compound was not added, the phenylhydrazine acting as both the basic nitrogen compound and as the reducing compound.

| Example | Monomer | Amine | Benzoin | Metallic Compound | Reaction Time | Percent Conversion |
|---|---|---|---|---|---|---|
| 9 | Styrene | Triethylamine, 0.18 | 1.0 | Ferric Acetylacetonate, 0.02 | 22 hrs | 63. |
| 10 | do | Pyridine, 0.25 | 1.0 | Ferric Acetylacetonate, 0.02 | 22 hrs | 46. |
| 11 | do | Triethylamine, 0.18 | 1.0 | Ferric Resinate, 0.10 | 20 hrs | 62. |
| 12 | Methyl Acrylate | Pyridine, 0.5 | 0.5 | Ferric Resinate, 0.10 | 1.0 hr | Solid. |
| 13 | do | Ammonia, 0.53 (Added as 28% aqueous solution.) | 0.5 | Ferric Resinate, 0.10 | 8 min | Do. |
| 14 | do | Phenylhydrazine, 0.55 | 0.5 | Ferric Resinate, 0.10 | <2 min | Do. |
| 15 | do | Phenylhydrazine, 0.55 |  | Ferric Resinate, 0.10 | 5 min / 1 hr | Very viscous. 52. |
| 16 | Vinyl Acetate | Triethylamine, 0.36 | 0.5 | Ferric Resinate, 0.10 | 4 hrs | 40. |

The homogeneous polymerization in accordance with this invention may be carried out by either bulk or solution polymerization under the conditions well known in the art for homogeneous polymerization. The temperature of the polymerization reaction may vary from about −50° C. to about 100° C. and preferably is from about −20° C. to about 70° C. While in most of the examples the air was removed from the reaction vessel prior to the polymerization reaction, this precaution is not necessary as may be seen in Example 4 where equally high conversions were obtained in the presence of air, all other factors remaining constant. Thus, it is possible to carry out the polymerization reaction by heating or refluxing the reactants in an open reaction vessel if desired. The examples have illustrated the process of carrying out the homogeneous polymerization in accordance with this invention by means of both bulk and solution polymerization. When the solution process is used, an excess of one of the reagents may be added as the solvent or a solvent such as benzene, toluene, xylene, hexane, acetone, and the like may be added.

Compounds which may be advantageously polymerized in accordance with this invention include any vinyl, or vinylidene, compounds; i. e., compounds containing the $CH_2=C<$ group, which are capable of being polymerized by a peroxide catalyst. Monomers which may be so polymerized are the conjugated butadienes such as butadiene, isoprene, dimethyl butadiene, chloroprene, etc., and other compounds containing the vinyl group such as styrene, acrylonitrile, methyl acrylate, methyl methacrylate, methyl vinyl ketone, vinyl pyridine, various vinyl ethers and esters, and other monomers which form addition polymers, as well as monomer mixtures of two or more of these monomers. In addition to the monomers containing the $CH_2=C<$ group which are capable of being polymerized by a peroxide catalyst are those monomers containing such a group which in combination with another unsaturated monomer provide a combination which is capable of polymerization with a peroxide catalyst as, for example, the isobutylene-hydroabietyl fumarate combination shown in the foregoing examples.

The polymerization processes of this invention are advantageous in that they allow the use of polymerization temperatures which are far below the thermal decomposition temperatures of the hydroperoxide. As a result, greatly improved polymers are obtained in many cases. They also make possible a much faster polymerization rate at a given temperature, resulting in a lower cost of the polymer, since less equipment and time are required to produce a given amount of the polymer.

What I claim and desire to protect by Letters Patent is:

1. The process which comprises homogeneously polymerizing a monomeric compound containing the $CH_2=C<$ group, and which is capable of being polymerized by a peroxide catalyst, in the presence of α,α-dimethylbenzyl hydroperoxide, an ionizable organic solvent-soluble ferric compound, an α-hydroxycarbonyl compound, and ammonia.

2. The process which comprises homogeneously polymerizing a monomeric compound containing the $CH_2=C<$ group, and which is capable of being polymerized by a peroxide catalyst, in the presence of α,α-dimethylbenzyl hydroperoxide, an ionizable organic solvent-soluble ferric compound, an α-hydroxycarbonyl compound, and a monoamine.

3. The process which comprises homogeneously polymerizing a monomeric compound containing the $CH_2=C<$ group, and which is capable of being polymerized by a peroxide catalyst, in the presence of α,α-dimethylbenzyl hydroperoxide, ferric resinate, an α-hydroxycarbonyl compound, and ammonia.

4. The process which comprises homogeneously polymerizing a monomeric compound containing the $CH_2=C<$ group, and which is capable of being poymerized by a peroxide catalyst, in the presence of α,α-dimethylbenzyl hydroperoxide, an ionizable organic solvent-soluble ferric compound, an α-hydroxycarbonyl compound, and an aliphatic monoamine.

5. The process which comprises homogeneously polymerizing a monomeric compound containing the $CH_2=C<$ group, and which is capable of being polymerized by a peroxide catalyst, in the presence of α,α-dimethylbenzyl hydroperoxide, an ionizable organic solvent-soluble ferric compound, an α-hydroxycarbonyl compound, and phenylhydrazine.

6. The process which comprises homogeneously polymerizing a monomeric compound containing the $CH_2=C<$ group, and which is capable of being polymerized by a peroxide catalyst, in the presence of a catalyst comprising an α,α-dialkylarylmethyl hydroperoxide in which each alkyl group contains not more than 4 carbon atoms and a basic nitrogen compound selected from the group consisting of ammonia, monoamines, hydrazine, and phenyl hydrazine.

7. The process which comprises homogeneously polymerizing a monomeric compound containing the $CH_2=C<$ group, and which is capable of being polymerized by a peroxide catalyst, in the presence of a catalyst comprising an α,α-dialkylarylmethyl hydroperoxide in which each alkyl group contains not more than 4 carbon atoms, an ionizable organic solvent-soluble heavy metal compound, and a basic nitrogen compound selected from the group consisting of ammonia, monoamines, hydrazine, and phenyl hydrazine.

8. The process which comprises homogeneously polymerizing a monomeric compound containing the $CH_2=C<$ group, and which is capable of being polymerized by a peroxide catalyst, in the presence of a catalyst comprising an $\alpha,\alpha$-dialkylarylmethyl hydroperoxide in which each alkyl group contains not more than 4 carbon atoms, an $\alpha$-hydroxycarbonyl compound, and a basic nitrogen compound selected from the group consisting of ammonia, monoamines, hydrazine, and phenyl hydrazine.

9. The process which comprises homogeneously polymerizing a monomeric compound containing the $CH_2=C<$ group, and which is capable of being polymerized by a peroxide catalyst, in the presence of a catalyst comprising $\alpha,\alpha$-dialkylarylmethyl hydroperoxide in which each alkyl group contains not more than 4 carbon atoms, an ionizable organic solvent-soluble heavy metal compound, an $\alpha$-hydroxycarbonyl compound, and a basic nitrogen compound selected from the group consisting of ammonia, monoamines, hydrazine, and phenyl hydrazine.

10. The process which comprises homogeneously copolymerizing a monomeric compound containing the $CH_2=C<$ group with an ethylenic unsaturated monomeric compound copolymerizable with the vinylidene compound in the presence of a peroxide catalyst, in the presence of an $\alpha,\alpha$-dialkylarylmethyl hydroperoxide in which each alkyl group contains not more than 4 carbon atoms and a basic nitrogen compound selected from the group consisting of ammonia, monoamines, hydrazine, and phenyl hydrazine.

11. The process which comprises homogeneously copolymerizing a monomeric compound containing the $CH_2=C<$ group with an ethylenic unsaturated monomeric compound copolymerizable with the vinylidene compound in the presence of a peroxide catalyst, in the presence of an $\alpha,\alpha$-dialkylarylmethyl hydroperoxide in which each alkyl group contains not more than 4 carbon atoms, an ionizable organic solvent-soluble heavy metal compound, and a basic nitrogen compound selected from the group consisting of ammonia, monoamines, hydrazine, and phenyl hydrazine.

12. The process which comprises homogeneously copolymerizing a monomeric compound containing the $CH_2=C<$ group with an ethylenic unsaturated monomeric compound copolymerizable with the vinylidene compound in the presence of a peroxide catalyst, in the presence of an $\alpha,\alpha$-dialkylarylmethyl hydroperoxide in which each alkyl group contains not more than 4 carbon atoms, an ionizable organic solvent-soluble heavy metal compound, an $\alpha$-hydroxycarbonyl compound, and a basic nitrogen compound selected from the group consisting of ammonia, monoamines, hydrazine, and phenyl hydrazine.

13. The process which comprises homogeneously polymerizing a monomeric compound containing the $CH_2=C<$ group, and which is capable of being polymerized by a peroxide catalyst, in the presence of a catalyst comprising an $\alpha,\alpha$-dialkylarylmethyl hydroperoxide in which each alkyl group contains not more than 4 carbon atoms, an ionizable organic solvent-soluble iron compound, and a basic nitrogen compound selected from the group consisting of ammonia, monoamines, hydrazine, and phenyl hydrazine.

14. The process which comprises homogeneously polymerizing a monomeric compound containing the $CH_2=C<$ group, and which is capable of being polymerized by a peroxide catalyst, in the presence of a catalyst comprising an $\alpha,\alpha$-dialkylarylmethyl hydroperoxide in which each alkyl group contains not more than 4 carbon atoms, an ionizable organic solvent-soluble iron compound, an $\alpha$-hydroxycarbonyl compound, and a basic nitrogen compound selected from the group consisting of ammonia, monoamines, hydrazine, and phenyl hydrazine.

15. The process which comprises homogeneously polymerizing a monomeric compound containing the $CH_2=C<$ group, and which is capable of being polymerized by a peroxide catalyst, in the presence of an $\alpha,\alpha$-dialkylarylmethyl hydroperoxide in which each alkyl group contains not more than 4 carbon atoms, an ionizable organic solvent-soluble iron compound, an $\alpha$-hydroxycarbonyl compound, and ammonia.

16. The process which comprises homogeneously polymerizing a monomeric compound containing the $CH_2=C<$ group, and which is capable of being polymerized by a peroxide catalyst, in the presence of an $\alpha,\alpha$-dialkylarylmethyl hydroperoxide in with each alkyl group contains not more than 4 carbon atoms, an ionizable organic solvent-soluble iron compound, an $\alpha$-hydroxycarbonyl compound, and a monoamine.

17. The process which comprises homogeneously polymerizing a monomeric compound containing the $CH_2=C<$ group, and which is capable of being polymerized by a peroxide catalyst, in the presence of an $\alpha,\alpha$-dialkylarylmethyl hydroperoxide in which each alkyl group contains not more than 4 carbon atoms, an ionizable organic solvent-soluble iron compound, an $\alpha$-hydroxycarbonyl compound, and phenyl hydrazine.

18. The process which comprises homogeneously polymerizing a monomeric compound containing the $CH_2=C<$ group, and which is capable of being polymerized by a peroxide catalyst, in the presence of $\alpha,\alpha$-dimethylbenzyl hydroperoxide, ferric acetylacetonate, an $\alpha$-hydroxycarbonyl compound, and an aliphatic monoamine.

19. The process which comprises homogeneously polymerizing a monomeric compound containing the $CH_2=C<$ group, and which is capable of being polymerized by a peroxide catalyst, in the presence of $\alpha,\alpha$-dimethylbenzyl hydroperoxide, ferric resinate, an $\alpha$-hydroxycarbonyl compound, and an aliphatic monoamine.

20. The process which comprises homogeneously polymerizing a monomeric compound containing the $CH_2=C<$ group, and which is capable of being polymerized by a peroxide catalyst, in the presence of $\alpha,\alpha$-dimethylbenzyl hydroperoxide, ferric resinate, an $\alpha$-hydroxycarbonyl compound, and phenyl hydrazine.

EDWIN J. VANDENBERG.

REFERENCES CITED

The following references are of record in the file of this patent:

UNITED STATES PATENTS

| Number | Name | Date |
| --- | --- | --- |
| 2,380,474 | Steward | July 31, 1945 |
| 2,395,523 | Vaughan | Feb. 26, 1946 |
| 2,429,060 | Hoover et al. | Oct. 14, 1947 |
| 2,452,669 | Levine | Nov. 2, 1948 |
| 2,467,033 | Hurdis | Apr. 12, 1949 |
| 2,480,928 | Hurdis | Sept. 6, 1949 |

FOREIGN PATENTS

| Number | Country | Date |
| --- | --- | --- |
| 883,679 | France | Mar. 29, 1943 |
| 610,293 | Great Britain | Oct. 13, 1948 |